(12) United States Patent
Webster

(10) Patent No.: US 7,688,081 B2
(45) Date of Patent: Mar. 30, 2010

(54) APPARATUS TO MEASURE THE CLEARANCE BETWEEN A FIRST COMPONENT AND A SECOND COMPONENT

(75) Inventor: John Richard Webster, Derby (GB)

(73) Assignee: Rolls-Royce PLC (GB)

( * ) Notice: Subject to any disclaimer, the term of this patent is extended or adjusted under 35 U.S.C. 154(b) by 0 days.

(21) Appl. No.: 12/264,685

(22) Filed: Nov. 4, 2008

(65) Prior Publication Data
US 2009/0128166 A1 May 21, 2009

(30) Foreign Application Priority Data
Nov. 21, 2007 (GB) ................................. 0722771.3

(51) Int. Cl.
*G01R 27/26* (2006.01)
(52) U.S. Cl. .................................... 324/662; 324/690
(58) Field of Classification Search ................. 324/662, 324/661, 658, 649, 600, 635, 644, 671, 699, 324/716, 326, 690, 696
See application file for complete search history.

(56) References Cited

U.S. PATENT DOCUMENTS

| 4,063,167 | A | * | 12/1977 | Duly ............................. 324/671 |
| 4,387,339 | A | | 6/1983 | Akerblom |
| 4,673,875 | A | | 6/1987 | Kjellqvist et al. |
| 5,140,494 | A | * | 8/1992 | Slade ........................... 361/212 |
| 5,166,626 | A | * | 11/1992 | Hester et al. ................. 324/690 |
| 5,497,101 | A | * | 3/1996 | Fillion ......................... 324/662 |
| 5,545,007 | A | * | 8/1996 | Martin ....................... 415/173.2 |
| 5,818,242 | A | * | 10/1998 | Grzybowski et al. ........ 324/642 |
| 6,717,418 | B2 | * | 4/2004 | Orenstein .................... 324/644 |

FOREIGN PATENT DOCUMENTS

| DE | 26 39 839 A1 | 3/1978 |
| DE | 28 42 231 | 4/1980 |
| EP | 1741880 A2 | 1/2007 |
| GB | 1518165 | 7/1978 |
| GB | 1557786 | 12/1979 |
| GB | 2057722 A | 4/1981 |
| GB | 2065410 A | 6/1981 |
| WO | 03/027607 A1 | 4/2003 |

* cited by examiner

*Primary Examiner*—Hoai-An D Nguyen
(74) *Attorney, Agent, or Firm*—McCormick, Paulding & Huber LLP

(57) ABSTRACT

An apparatus for determining a clearance between rotor blade tips of rotor blades mounted on a rotor and a stator lining mounted on a stator casing. The stator lining is movable radially relative to the stator casing. The stator lining comprises an abradable material. At least one probe is arranged to measure the clearance between blade tips and stator lining. A first portion of the at least one probe is arranged within the stator lining and a tip of the first portion of the at least one probe is arranged flush with the surface of the abradable material. The tip of the first portion of the at least one probe comprises an abradable material. A second portion of the at least one probe is secured to the stator casing. A wire-less and connector-less coupling transmits a measurement signal from the first portion to the second portion of the at least one probe to allow radial movement of the stator lining relative to the stator casing.

20 Claims, 6 Drawing Sheets

APPARATUS TO MEASURE THE CLEARANCE BETWEEN A FIRST COMPONENT AND A SECOND COMPONENT

CROSS REFERENCE TO RELATED APPLICATION

This application is entitled to the benefit of British Patent Application No. GB 0722771.3, filed on Nov. 21, 2007.

FIELD OF THE INVENTION

The present invention relates to an apparatus to measure the clearance between a first component and a second component, in particular to an apparatus to measure the clearance between a rotor and a stator, and more particularly to an apparatus to measure the clearance, or sealing gap, between a rotor blade tip and a liner of stator casing of a turbomachine, for example a gas turbine engine.

BACKGROUND OF THE INVENTION

A turbine, or compressor, of a gas turbine engine comprises one or more stages of rotor blades arranged alternately with one or more stages of stator vanes. Each of the rotor blades comprises a root, a shank, a platform and an aerofoil. The rotor blades are arranged circumferentially around a rotor and the rotor blades extend generally radially from the rotor. The roots of the rotor blades are located in axially, or circumferentially, extending slots in the periphery of a rotor. The platforms of the rotor blades together define the inner boundary of a portion of the flow path through the turbine, or compressor. The rotor blades have tips at their radially outer ends. A stator casing surrounds the rotor blades and a liner is supported from the casing to define the outer boundary of the flow path through the turbine, or compressor. The liner is spaced radially from the tips of the rotor blades to define a clearance, or sealing gap.

The clearance controls the amount of gas, or air, leaking from the flow path through the turbine, or compressor. The gas, or air, leaking from the flow path flows through the clearance between the tips of the rotor blades and the liner rather than flow through the passage defined between adjacent rotor blades and the liner.

The casing of the stator may be provided with optical probes, capacitance probes, inductance probes or microwave probes located on the casing and arranged to measure the clearance between the rotor blade tips and the liner.

The optical probes are the most accurate but these are subject to the build up of dirt on the optical probe, which reduces the strength of the optical signal and may eventually lead to the loss of an optical signal. Capacitance probes are not as accurate or as robust.

These probes make measurements relative to a fixed datum, either on the casing or at another point behind the liner. This requires knowledge of the offset distance between the datum point and the inner surface of the liner. The offset distance changes as a result of wear of the liner, movement of the liner segments or thermal expansion of the liner segments etc.

In addition, the liner may be moved radially to actively control the clearance between the tips of the rotor blades and the liner.

SUMMARY OF THE INVENTION

Accordingly, the present invention seeks to provide a novel apparatus to measure the clearance between a first component, a rotor, and a second component, a stator, which reduces, preferably overcomes, the above-mentioned problem.

Accordingly, the present invention provides an apparatus for determining a clearance between a first component and a second component, the first and second components being movable relative to each other, a lining being mounted on the second component, the lining comprising an abradable material, at least one probe to measure the clearance, a first portion of the at least one probe being arranged within the lining, a tip of the first portion of the at least one probe being arranged flush with the surface of the abradable material, the tip of the first portion of the at least one probe comprising an abradable material.

Preferably, the lining is movable relative to the second component.

Preferably, a second portion of the at least one probe being secured to the second component, a wire-less and connector-less coupling to transmit a measurement signal from the first portion to the second portion of the at least one probe to allow movement of the lining relative to the second component.

Preferably, the first component comprises a rotor and the second component comprises a stator, the rotor comprises rotor blades mounted on the rotor and the rotor blades have rotor blade tips, the stator having a stator casing and a stator lining, the stator lining being mounted on the stator casing, the stator lining being movable relative to the stator casing, the stator lining comprising an abradable material, at least one probe to measure the clearance between the rotor blade tips and the stator lining, a first portion of the at least one probe being arranged within the stator lining, a tip of the first portion of the at least one probe being arranged flush with the surface of the abradable material, the tip of the first portion of the at least one probe comprising an abradable material, a second portion of the at least one probe being secured to the stator casing, a wire-less and connector-less coupling to transmit a measurement signal from the first portion to the second portion of the at least one probe to allow movement of the stator lining relative to the stator casing.

Preferably, the at least one probe comprises a capacitance probe. Preferably, the first portion of the at least one probe comprises a conductor positioned within an insulator within the stator lining and the tip of the conductor and the tip of the insulator are abradable.

Preferably, the tip of the conductor comprises graphite or carbon.

Preferably, the conductor extends from the stator lining towards the stator casing, the second portion of the probe comprises two spaced conductors extending from the stator casing towards the stator lining, the conductor of the first portion of the at least one probe is arranged between the conductors of the second portion of the at least one probe to form a capacitive coupling.

Preferably, a conductor of the second portion of the at least one probe is connected to an analyser to calculate the clearance.

Alternatively, the at least one probe comprises an inductance probe.

The first portion of the at least one probe comprises a magnet within the stator lining and the tip of the magnet is abradable.

The tip of the magnet may be a ferromagnet.

The tip of the magnet comprises iron powder in a non-magnetic matrix material, iron powder in a thermoplastic matrix material or neodymium-iron-boron in a nylon matrix material.

The magnet extends from the stator lining towards the stator casing, the second portion of the probe comprises a coil extending from the stator casing towards the stator lining, the magnet of the first portion of the at least one probe is arranged within the coil of the second portion of the at least one probe to form an inductive coupling.

The coil of the second portion of the at least one probe is connected to an analyser to calculate the clearance.

Alternatively, the at least one probe comprises a microwave probe.

The first portion of the at least one probe comprises a waveguide positioned within the stator lining and the tip of the waveguide is abradable. The waveguide may be filled with a dielectric. The dielectric is abradable.

Preferably, the waveguide extends from the stator lining towards the stator casing, the second portion of the probe comprises a microwave sensor extending from the stator casing towards the stator lining, the waveguide of the first portion of the at least one probe is arranged to direct microwaves to the second portion of the at least one probe through a variable air coupling.

Preferably, the microwave sensor of the second portion of the at least one probe is connected to an analyser to calculate the clearance.

Preferably, the rotor includes a plurality of rotor blades.

Preferably, the rotor blades are turbine rotor blades. Alternatively the rotor blades are compressor rotor blades.

The compressor may be an axial flow compressor or a centrifugal flow compressor. The turbine may be an axial flow turbine or a radial flow turbine.

The first component may be a shaft and the second component may be a bearing housing.

DETAILED DESCRIPTION OF THE PREFERRED EMBODIMENTS

Figure 1:
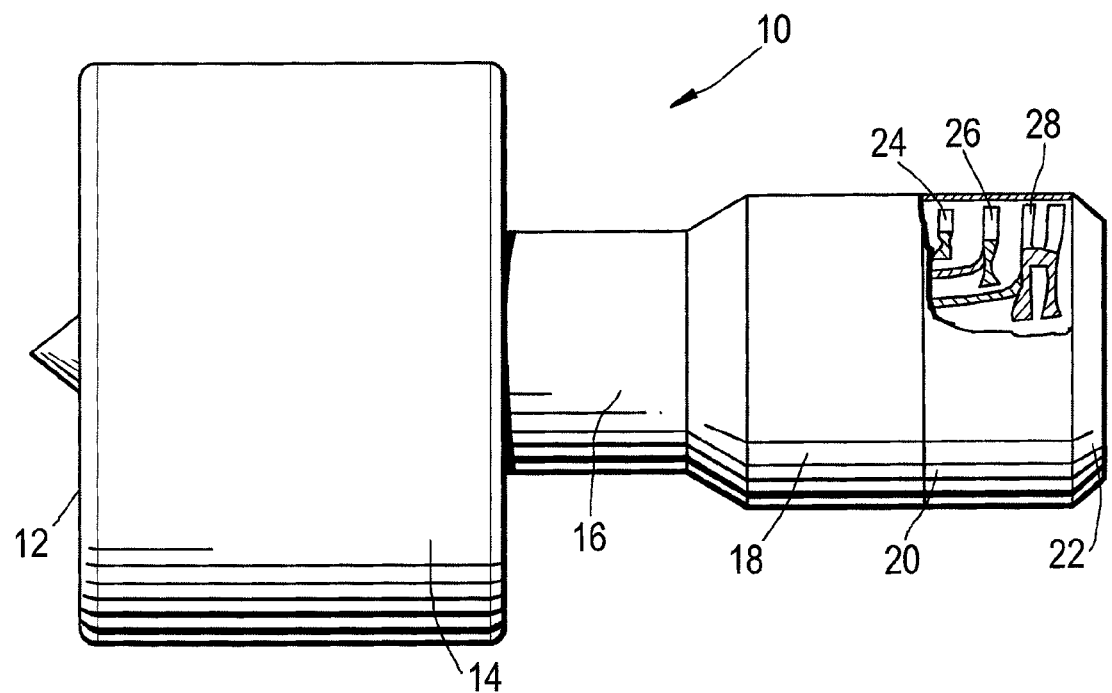
FIG. 1 shows a turbofan gas turbine engine having an apparatus for determining a clearance between relatively movable components according to the present invention.

A turbofan gas turbine engine 10, as shown in FIG. 1, comprises in axial flow series an intake 12, a fan section 14, a compressor section, 16, a combustion section 18, a turbine section 20 and a core exhaust 22. The turbine section 20 comprises a high-pressure turbine 24 arranged to drive a high-pressure compressor (not shown) in the compressor section 16, an intermediate pressure turbine 26 arranged to drive an intermediate pressure compressor (not shown) in the compressor section 16 and a low pressure turbine 28 arranged to drive a fan (not shown) in the fan section 14.

Figure 2:
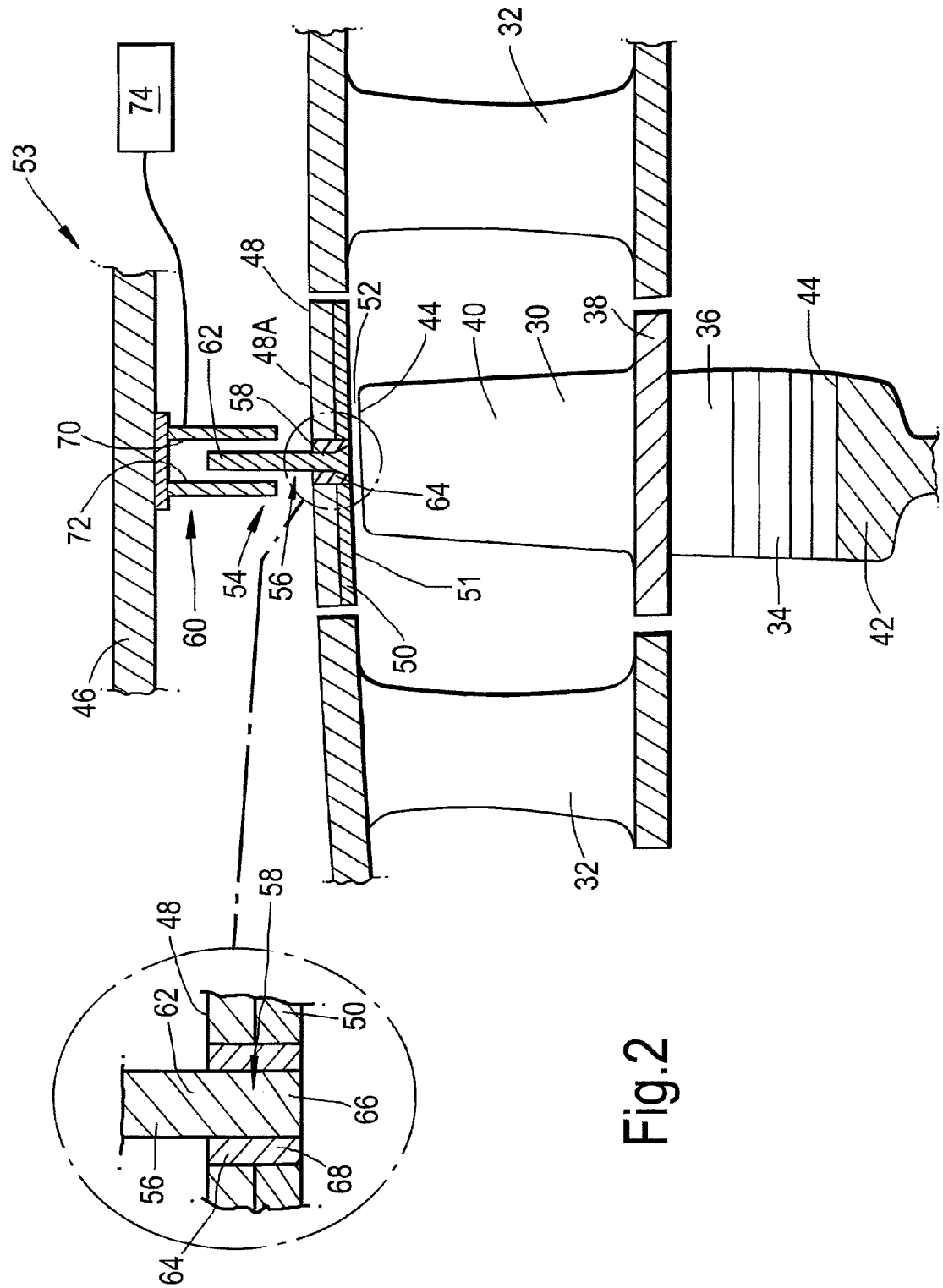
FIG. 2 shows an enlarged view of an apparatus for determining a clearance between a rotor blade and a stator casing according to the present invention.

The high-pressure turbine 24 of the turbine section 20 is shown more clearly in FIG. 2. The high-pressure turbine 24 comprises one or more stages of turbine rotor blades 30 arranged alternately with one or more stages of turbine stator vanes 32. Each of the turbine rotor blades 30 comprises a root 34, a shank 36, a platform 38 and an aerofoil 40. The turbine rotor blades 30 are arranged circumferentially around a turbine rotor 42 and the turbine rotor blades 30 extend generally radially from the turbine rotor 42. The roots 36 of the turbine rotor blades 30 are located in circumferentially, or axially, extending slots 44 in the periphery of the turbine rotor 42. The platforms 36 of the turbine rotor blades 30 together define the inner boundary of a portion of the flow path through the high-pressure turbine 24. The aerofoils 40 of the turbine rotor blades 30 have tips 44 at their radially outer extremities.

The turbine rotor blades 30 are enclosed by a generally cylindrical, or conical, stator casing 46, which is provided with a stator lining 48. The stator lining 48 is provided with an abradable material 50 on its inner surface. The tips 44 of the turbine rotor blades 30 are spaced from the abradable material 50 by a clearance 52. The abradable material 50 forms a lining on the inner surface of the stator lining 48. The stator lining 48 is movable radially relative to the stator casing 46 and the stator lining 48 comprises a plurality of circumferentially arranged segments 48A.

An apparatus 53 for determining the clearance 50 between the tips 44 of the turbine rotor blades 30 and the stator lining 48 on the stator casing 46 is provided, as shown in FIG. 2. At least one capacitance probe 54 is provided to measure the clearance 52 and the capacitance probe 54 comprises a first portion 56 arranged within the stator lining 48. A radially inner tip 58 of the first portion 56 of the at least one capacitance probe 54 is arranged flush with the surface 51 of the abradable material 50 and the tip 58 of the first portion 56 of the at least one capacitance probe 54 comprises an abradable material. A second portion 60 of the at least one capacitance probe 54 is secured to the stator casing 46 and a wire-less and connector-less coupling transmits a measurement signal from the first portion 56 to the second portion 58 of the at least one capacitance probe 54 to allow radial movement of the stator lining 48 relative to the stator casing 46.

The first portion 56 of the at least one capacitance probe 54 comprises a conductor 62 positioned within an insulator 64 within the stator lining 48 and the radially inner tip 66 of the conductor 62 and the radially inner tip 68 of the insulator 64 are abradable.

The radially inner tip 66 of the conductor 62 comprises for example graphite or carbon. The conductor 62 extends radially outwardly from the stator lining 48 towards the stator casing 46. The second portion 60 of the capacitance probe 54 comprises two spaced conductors 70 and 72 extending radially inwardly from the stator casing 46 towards the stator lining 48 and the conductor 62 of the first portion 56 of the at least one capacitance probe 54 is arranged between the conductors 70 and 72 of the second portion 60 of the at least one capacitance probe 54 to form a capacitive coupling. A conductor 70 of the second portion 60 of the at least one capacitance probe 54 is connected to an analyser 74 to calculate the clearance.

In operation, as the rotor blades 30 rotate and abrade the abradable lining 50 on the stator lining 48 the radially inner tip 58 of the capacitance probe 54 is also abraded, so that it remains flush with the radially inner surface 51 of the abradable material 50. The conductor 62 forms a capacitance with the tips 44 of the turbine rotor blades 30 and the capacitance formed between the tips 44 of the turbine rotor blades 30 and the conductor 62 varies with the clearance 52.

The geometry of the capacitive coupling between the conductor 62 on the first portion 54 of the capacitance probe 54 and the conductor 70 and 72 on the second portion 60 of the capacitance probe 54 is arranged such that the change in capacitance in the capacitive coupling as the stator lining 48 moves radially is small compared to the change in the capacitance due to the change in the clearance 50.

Figure 3:
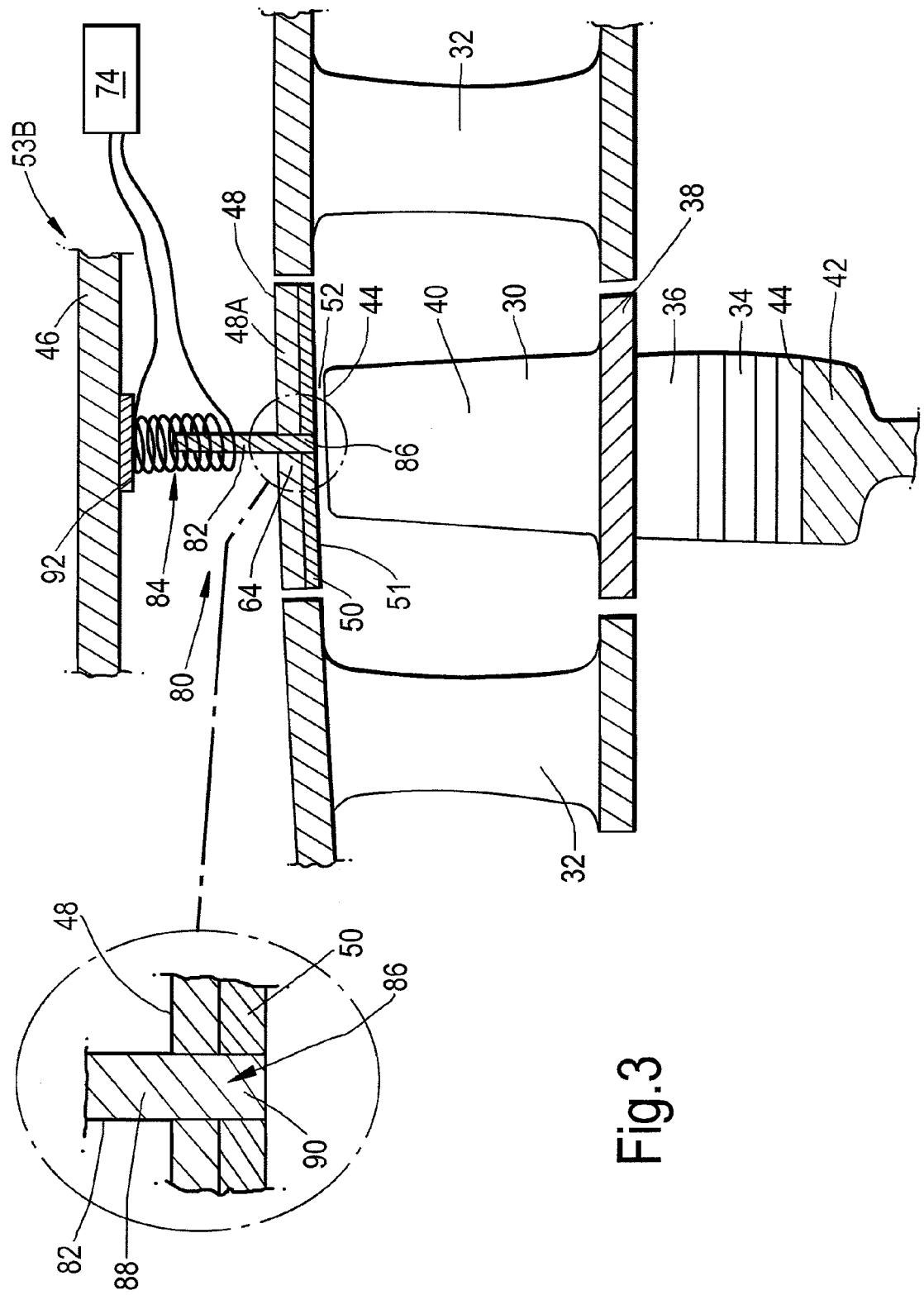
FIG. 3 shows an enlarged view of another apparatus for determining a clearance between a rotor blade and a stator casing according to the present invention.

An alternative apparatus 53B for determining the clearance 52 between the tips 44 of the turbine rotor blades 30 and the stator lining 48 of the stator casing 46 is shown in FIG. 3. At least one inductance probe 80 is provided to measure the clearance 52 and the inductance probe 80 comprises a first portion 82 arranged within the stator lining 48. A radially inner tip 86 of the first portion 82 of the at least one inductance probe 80 is arranged flush with the surface 51 of the abradable material 50 and the tip 86 of the first portion 82 of the at least one inductance probe 80 comprises an abradable material. A second portion 84 of the at least one inductance probe 80 is secured to the stator casing 46 and a wire-less and connector-less coupling transmits a measurement signal from the first portion 82 to the second portion 84 of the at least one inductance probe 80 to allow radial movement of the stator lining 48 relative to the stator casing 46.

The first portion 82 of the at least one inductance probe 80 comprises a magnet 88 positioned within the stator lining 48 and the radially inner tip 90 of the magnet 88 is abradable.

The radially inner tip 90 of the magnet 88 may be a ferromagnet. The radially inner tip 90 of the magnet 88 may comprise iron powder in a non-magnetic matrix material, iron powder in a thermoplastic matrix material or neodymium-iron-boron in a nylon matrix material.

The magnet 88 extends radially outwardly from the stator lining 48 towards the stator casing 46. The second portion 84 of the inductance probe 80 comprises a coil 92 extending radially inwardly from the stator casing 46 towards the stator lining 48 and the magnet 88 of the first portion 82 of the at least one inductance probe 80 is arranged within the coil 92 of the second portion 84 of the at least one inductance probe 80 to form an inductive coupling. The coil 92 of the second portion 84 of the at least one inductance probe 80 is connected to an analyser 74 to calculate the clearance.

In operation, as the rotor blades 30 rotate and abrade the abradable lining 50 on the stator lining 48 the radially inner tip 86 of the inductance probe 80 is also abraded, so that it remains flush with the radially inner surface 51 of the abradable material 50. The magnet 88 forms an inductance with the tips 44 of the turbine rotor blades 30 and the inductance formed between the tips 44 of the turbine rotor blades 30 and the magnet 88 varies with the clearance 52.

The geometry of the inductive coupling between the magnet 88 on the first portion 82 of the inductance probe 80 and the coil 92 on the second portion 84 of the inductance probe 80 is arranged such that the change in inductance in the inductive coupling as the stator lining 48 moves radially is small compared to the change in the inductance due to the change in the clearance 50. As the turbine rotor blade 30 moves towards the magnet 88 an electrical current is produced in the coil 92 and the electrical current is related to the clearance 52. It may be possible to use a permanent magnet with an abradable radially inner tip, a permanent magnet with an abradable radially inner ferromagnetic tip or a ferromagnetic element with an abradable radially inner tip and an energising coil wound around the ferromagnetic element to form an electromagnet with a separate pick up coil. The energising coil may be energised by an AC or a DC current.

Figure 4:
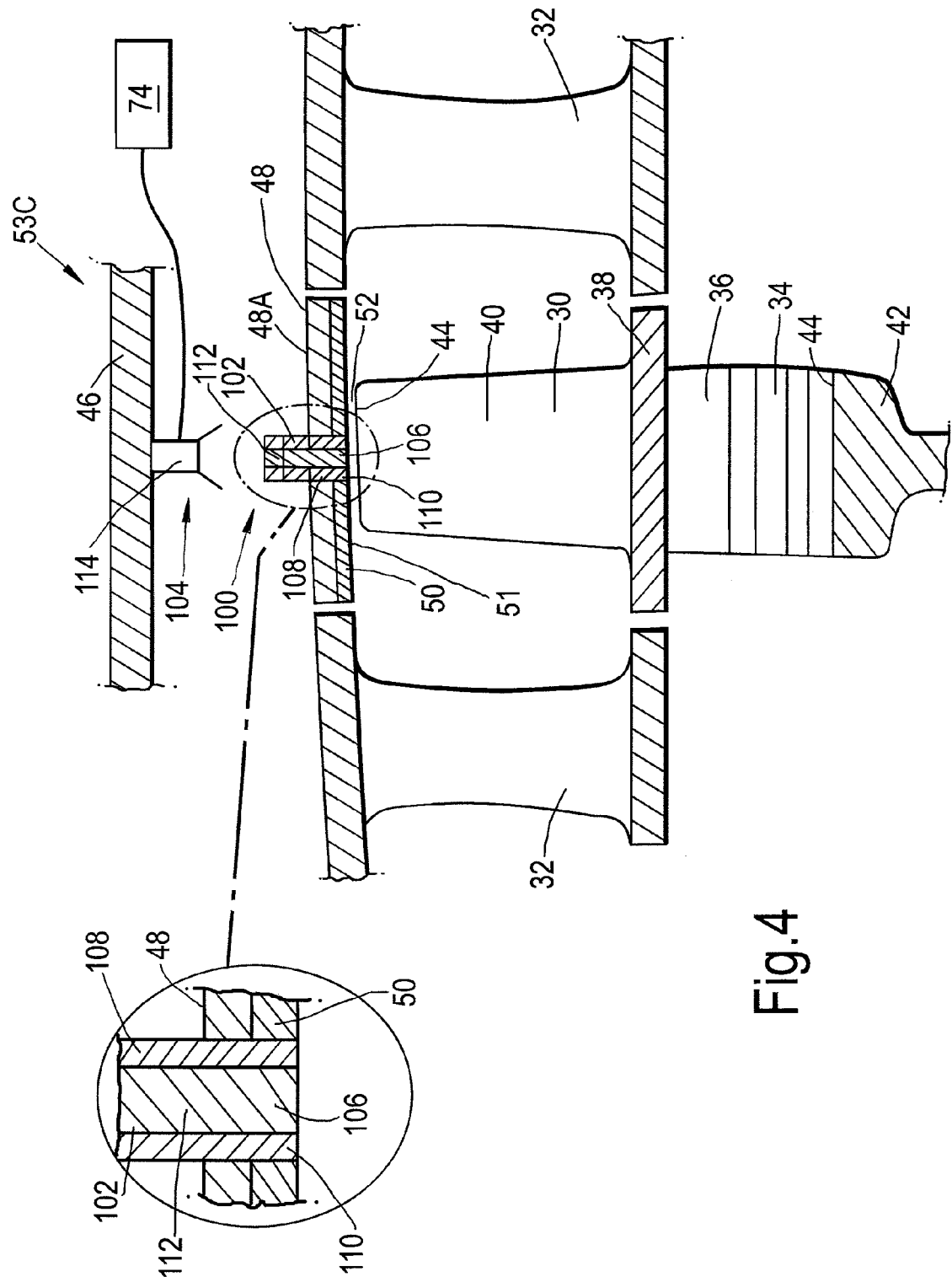
FIG. 4 shows an enlarged view of a further apparatus for determining a clearance between a rotor blade and a stator casing according to the present invention.

An alternative apparatus 53C for determining the clearance 52 between the tips 44 of the turbine rotor blades 30 and the stator lining 48 of the stator casing 46 is shown in FIG. 4. At least one microwave probe 100 is provided to measure the clearance 52 and the microwave probe 100 comprises a first portion 102 arranged within the stator lining 48. A radially inner tip 106 of the first portion 102 of the at least one microwave probe 100 is arranged flush with the surface 51 of the abradable material 50 and the tip 106 of the first portion 102 of the at least one microwave probe 100 comprises an abradable material. A second portion 104 of the at least one microwave probe 100 is secured to the stator casing 46 and a wire-less and connector-less coupling transmits a measurement signal from the first portion 102 to the second portion 104 of the at least one microwave probe 100 to allow radial movement of the stator lining 48 relative to the stator casing 46.

The first portion 102 of the at least one microwave probe 100 comprises a waveguide 108 positioned within the stator lining 48 and the radially inner tip 110 of the waveguide 108 is abradable. The waveguide 108 may be filled with a dielectric 112 and the dielectric 112 is abradable. The dielectric 112 is beneficial because it enhances the detection of the end of the waveguide 108 and to emphasise the difference between the waveguide 108 and the gas, or air, in the clearance 50. The dielectric 112 also prevents the ingress of dirt, oil, grease etc into the waveguide 108.

The waveguide 108 extends radially outwardly from the stator lining 48 towards the stator casing 46. The second portion 104 of the microwave probe 100 comprises a microwave sensor 114 extending radially inwardly from the stator casing 46 towards the stator lining 48 and the waveguide 108 of the first portion 102 of the at least one microwave probe 100 is arranged to direct microwaves to the microwave sensor 114 of the second portion 104 of the at least one microwave probe 100 to form a microwave coupling and the microwave sensor 114 is connected to an analyser 74 to calculate the clearance. The microwave sensor 114 is fixed to the stator casing 46 and the microwave sensor 114 is arranged to direct microwaves radially and receive microwaves radially.

In operation, as the rotor blades 30 rotate and abrade the abradable lining 50 on the stator lining 48 the radially inner tip 106 of the microwave probe 100 is also abraded, so that it remains flush with the radially inner surface 51 of the abradable material 50. The waveguide 108 directs microwaves towards and receives microwaves reflected back from the tips 44 of the turbine rotor blades 30.

The geometry of the coupling between the waveguide 108 on the first portion 82 of the microwave probe 100 and the microwave sensor 114 on the second portion 104 of the microwave probe 100 is arranged such that there is a variable air gap between the radially outer end 109 of the waveguide 108 and the microwave sensor 114.

Figure 5:
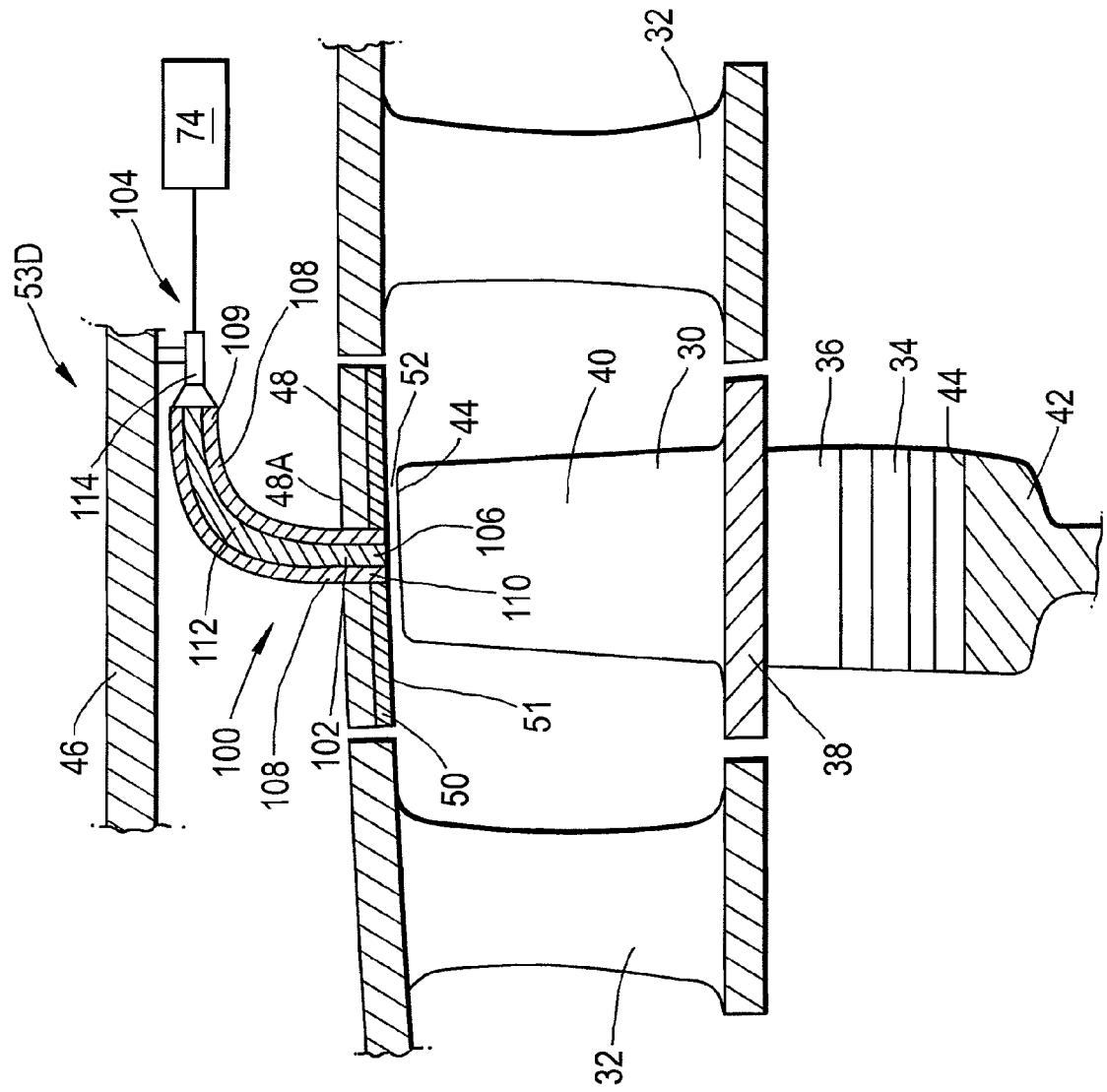
FIG. 5 shows an enlarged view of an alternative apparatus for determining a clearance between a rotor blade and a stator casing according to the present invention.

An alternative apparatus 53D for determining the clearance 52 between the tips 44 of the turbine rotor blades 30 and the stator lining 48 of the stator casing 46 is shown in FIG. 5. At least one microwave probe 100 is provided to measure the clearance 52 and the microwave probe 100 comprises a first portion 102 arranged within the stator lining 48. This differs from the embodiment in FIG. 4 in that the radially outer end 109 of the waveguide 108 is directly connected to the microwave sensor 114. The microwave sensor 114 is fixed to the stator casing 46 and the microwave sensor 114 is arranged to direct microwaves axially, receive microwaves axially and the waveguide 108 is flexible and is curved to change the direction of the microwaves between axial and radial directions and visa-versa.

Figure 6:
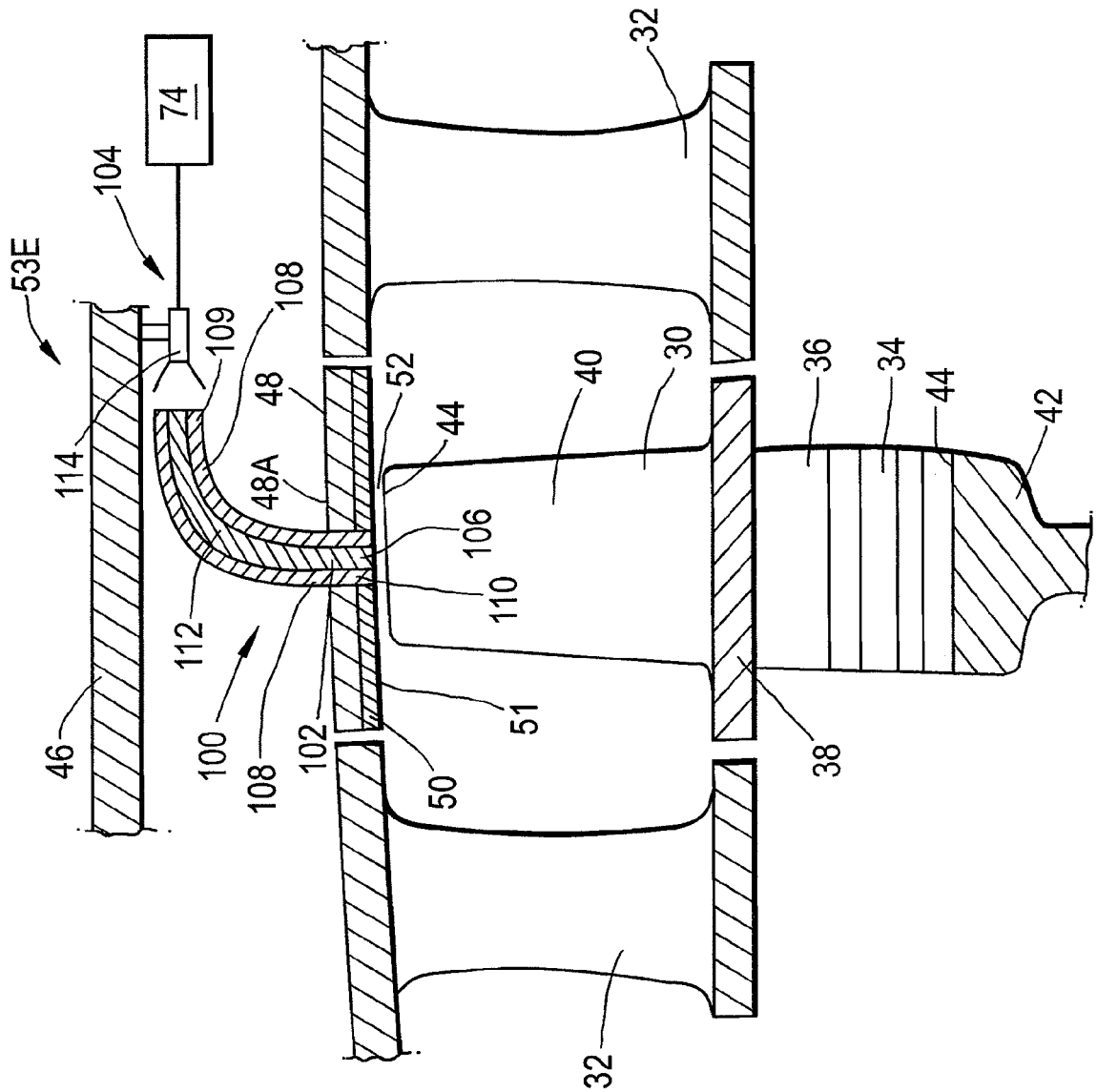
FIG. 6 shows an enlarged view of an alternative apparatus for determining a clearance between a rotor blade and a stator casing according to the present invention.

A further alternative apparatus 53E for determining the clearance 52 between the tips 44 of the turbine rotor blades 30 and the stator lining 48 of the stator casing 46 is shown in FIG. 6. At least one microwave probe 100 is provided to measure the clearance 52 and the inductance probe 100 comprises a first portion 102 arranged within the stator lining 48. This differs from the embodiment in FIG. 4 in that the radially outer end 109 of the waveguide 108 is not directly connected to the microwave sensor 114. The microwave sensor 114 is fixed to the stator casing 46 and the microwave sensor 114 is arranged to direct microwaves axially and to receive microwaves axially, but the waveguide 108 is rigid and is curved to change the direction of the microwaves between axial and radial directions and visa-versa.

Although the present invention has been described with reference to turbine rotor blades, it is equally applicable to compressor rotor blades or fan rotor blades. Although the present invention has been described with reference to a gas turbine engine it is equally applicable to a steam turbine or other turbomachines. Although the present invention has been described with reference to axial flow arrangements, it is also applicable to centrifugal/radial flow arrangements, e.g. a centrifugal compressor or a radial flow turbine, in which case the stator lining may move axially. The present invention is also applicable to stator linings between a shaft and a bearing housing. The present invention is also applicable to determining the clearance/distance between an abradable lining, or abradable surface and a water jet.

The advantage of the present invention is that it provides direct measurement of the clearance, the distance, between the rotor blades and the stator lining independent of wear or movements. The present invention does not need flexible electrical connections into moving stator linings and hence allows measurement of the clearance between rotor blades and a movable stator lining for active control of the clearance, distance, between the rotor blades and the movable stator lining.

What is claimed is:

1. An apparatus for determining a clearance between a rotor and a stator, the rotor having a plurality of rotor blades mounted on the rotor and the rotor blades have rotor blade tips, the stator having a stator casing and a stator lining, the stator lining is mounted on the stator casing, the stator lining is movable relative to the stator casing, the stator lining having an abradable material, the apparatus comprising at least one probe to measure the clearance between the rotor blade tips and the stator lining, a first portion of the at least one probe is arranged within the stator lining, a tip of the first portion of the at least one probe is arranged flush with the surface of the abradable material, the tip of the first portion of the at least one probe comprises an abradable material, a second portion of the at least one probe is secured to the stator casing, a wire-less and connector-less coupling to transmit a measurement signal from the first portion to the second portion of the at least one probe to allow movement of the stator lining relative to the stator casing.

2. An apparatus as claimed in claim 1 wherein the at least one probe comprises a capacitance probe.

3. An apparatus as claimed in claim 1 wherein the first portion of the at least one probe further comprises a conductor positioned within an insulator within the stator lining and the tip of the conductor and the tip of the insulator are abradable.

4. An apparatus as claimed in claim 3 wherein the tip of the conductor further comprises graphite or carbon.

5. An apparatus as claimed in claim 3 wherein the conductor extends from the stator lining towards the stator casing, the second portion of the probe comprises two spaced conductors extending from the stator casing towards the stator lining, the conductor of the first portion of the at least one probe is arranged between the conductors of the second portion of the at least one probe to form a capacitive coupling.

6. An apparatus as claimed in claim 5 wherein a conductor of the second portion of the at least one probe is connected to an analyser to calculate the clearance.

7. An apparatus as claimed in claim 1 wherein the at least one probe further comprises an inductance probe.

8. An apparatus as claimed in claim 7 wherein the first portion of the at least one probe comprises a magnet within the stator lining and the tip of the magnet is abradable.

9. An apparatus as claimed in claim 8 wherein the tip of the magnet is a ferromagnet.

10. An apparatus as claimed in claim 8 wherein the tip of the magnet is selected from the group comprising iron powder in a non-magnetic matrix material, iron powder in a thermoplastic matrix material and neodymium-iron-boron in a nylon matrix material.

11. An apparatus as claimed in claim 8 wherein the magnet extends from the stator lining towards the stator casing, the second portion of the probe further comprises a coil extending from the stator casing towards the stator lining, the magnet of the first portion of the at least one probe is arranged within the coil of the second portion of the at least one probe to form an inductive coupling.

12. An apparatus as claimed in claim 11 wherein the coil of the second portion of the at least one probe is connected to an analyser to calculate the clearance.

13. An apparatus as claimed in claim 1 wherein the at least one probe comprises a microwave probe.

14. An apparatus as claimed in claim 13 wherein the first portion of the at least one probe further comprises a waveguide positioned within the stator lining and the tip of the waveguide is abradable.

15. An apparatus as claimed in claim 14 wherein the waveguide is filled with a dielectric.

16. An apparatus as claimed in claim 15 wherein the dielectric is abradable.

17. An apparatus as claimed in claim 14 wherein the waveguide extends from the stator lining towards the stator casing, the second portion of the probe comprises a microwave sensor extending from the stator casing towards the stator lining, the waveguide of the first portion of the at least one probe is arranged to direct microwaves to the second portion of the at least one probe through a variable air coupling.

18. An apparatus as claimed in claim 17 wherein the microwave sensor of the second portion of the at least one probe is connected to an analyser to calculate the clearance.

19. An apparatus as claimed in claim 1 wherein the rotor blades are turbine rotor blades.

20. An apparatus as claimed in claim 1 wherein the rotor blades are compressor rotor blades.

* * * * *